United States Patent

Snoy et al.

[15] 3,651,904
[45] Mar. 28, 1972

[54] TRANSMISSION WITH SIMULTANEOUSLY ENGAGED CLUTCHES FOR BRAKING

[72] Inventors: Joseph B. Snoy; Bradford K. Shull, both of Rockford, Ill.

[73] Assignee: Twin Disc, Incorporated, Racine, Wis.

[22] Filed: June 16, 1970

[21] Appl. No.: 46,767

[52] U.S. Cl. .................... 192/4 A, 192/87.13, 192/113 B, 251/30
[51] Int. Cl. .................................................. B60k 29/02
[58] Field of Search ............... 192/4 A, 4 C, 113 B, 87.13

*Primary Examiner*—Benjamin W. Wyche
*Attorney*—James E. Nilles

[57] ABSTRACT

A power transmission of the type having interchangeable gear sets connected to hydraulically actuated friction clutches. The clutches are selectively engageable to establish various gear ratios for changing the speed and direction of the vehicle. A brake is provided for the transmission by engaging a pair of these hydraulically actuated clutches at the same time, the two clutches being connected to a common jack shaft through gears of different ratios. The jack shaft is geared directly to the wheels of the vehicle and by engaging both clutches at the same time, the gears have no synchronous ratio except zero r.p.m. Thus, one of the clutches has been engaged and the second clutch is then engaged to cause the braking action, the second clutch slipping until the vehicle stops.

1 Claim, 5 Drawing Figures

INVENTORS.
JOSEPH B. SNOY
BRADFORD K. SHULL
BY: James E. Nilles
ATTORNEY

INVENTORS.
JOSEPH B. SNOY
BRADFORD K. SHULL
BY:
James E. Nilles
ATTORNEY

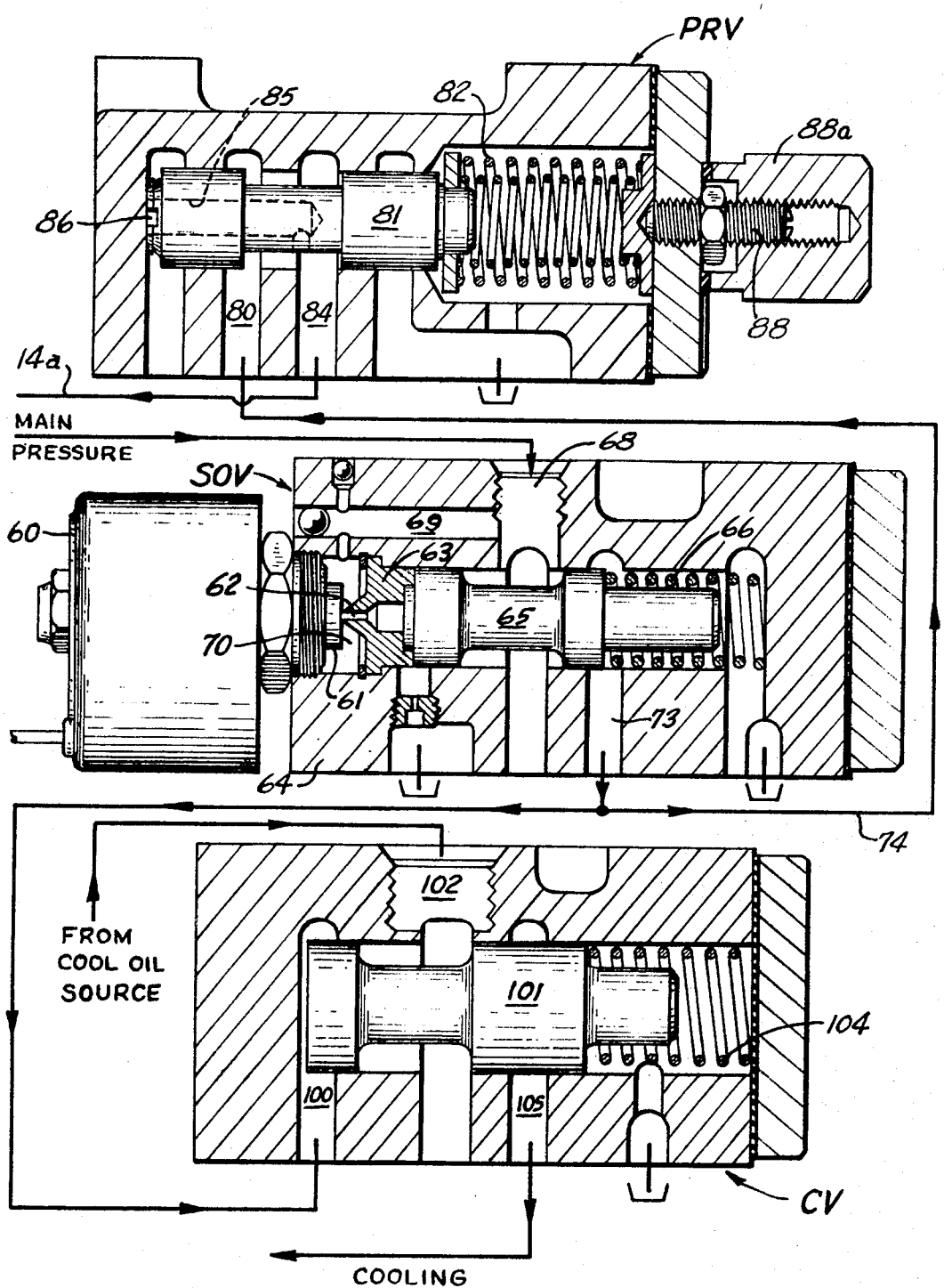

TRANSMISSION WITH SIMULTANEOUSLY ENGAGED CLUTCHES FOR BRAKING

BACKGROUND OF THE INVENTION

Power shift transmissions with which the present invention finds utility are of that type employing a plurality of parallel shafts having gears attached to them and also utilizing multi-disc, hydraulically engaged friction clutches. The clutch shafts have a least two single clutches mounted on them and thus, the power path and direction of speed rotation is obtain by selectively engaging these clutches. The clutches are usually actuated by a control system which allows high pressure fluid to be directed from the main valve body through individual hydraulic lines and through the shafts to the proper clutch actuating chamber. The gears of the shafts are in constant mesh, and the gears in the power path which are not being used at the time are simply allowed to rotate at their synchronous speed and direction through their respective disengaged clutch.

The following procedure is used to reverse the direction of a conventional powershift transmission running at rated or variable engine speeds. The operator first stops the vehicle with its brakes, reverses the transmission, and proceeds in the opposite direction. The operator may try to speed up this procedure by initiating shift before he should and possibly not reducing engine speed sufficiently. He may have the skill of manipulation that allows him to do it successfully for a while, but eventually this type of operation will result in a transmission failure. In a shuttle type of vehicle, it is extremely desirable to make the forward-reverse shift as simple, smooth and fast as possible. There are several elaborate methods of accomplishing this, but the present invention provides a simple and economical way to accomplish this.

SUMMARY OF THE PRESENT INVENTION

The present invention provides a transmission of the type having a plurality of hydraulically actuated friction clutches and change gears connected therewith for selectively establishing various speed and direction ratios for the vehicle. More specifically, the invention provides a brake and control system therefor by means of which two of these clutches can be engaged at the same time to cause braking of the vehicle.

More specifically, the present invention provides a transmission of the type in which the two clutches that are engaged at the same time are connected, by gears having different ratios, to a common jack shaft, the jack shaft being geared directly to the wheels of the vehicle. By engaging both clutches at the same time, a clutch of less capacity than the other clutch is permitted to slip until the vehicle is brought to a stop by the two engaged clutches.

The invention provides a transmission of the above type in which the brake is actually a clutch that is made to operate as a brake, but this clutch does not need to absorb any power from the engine.

These and other objects and advantages of the present invention will appear hereinafter as this disclosure progresses, reference being had to the accompanying drawings.

BRIEF DESCRIPTION OF THE DRAWINGS

FIG. 2a is a sectional view taken along line 2a—2a in FIG. 2, but on a reduced scale;

FIG. 4 is a sectional view of the valves shown in FIG. 3, but on an enlarged scale.

DESCRIPTION OF A PREFERRED EMBODIMENT

Figure 1:
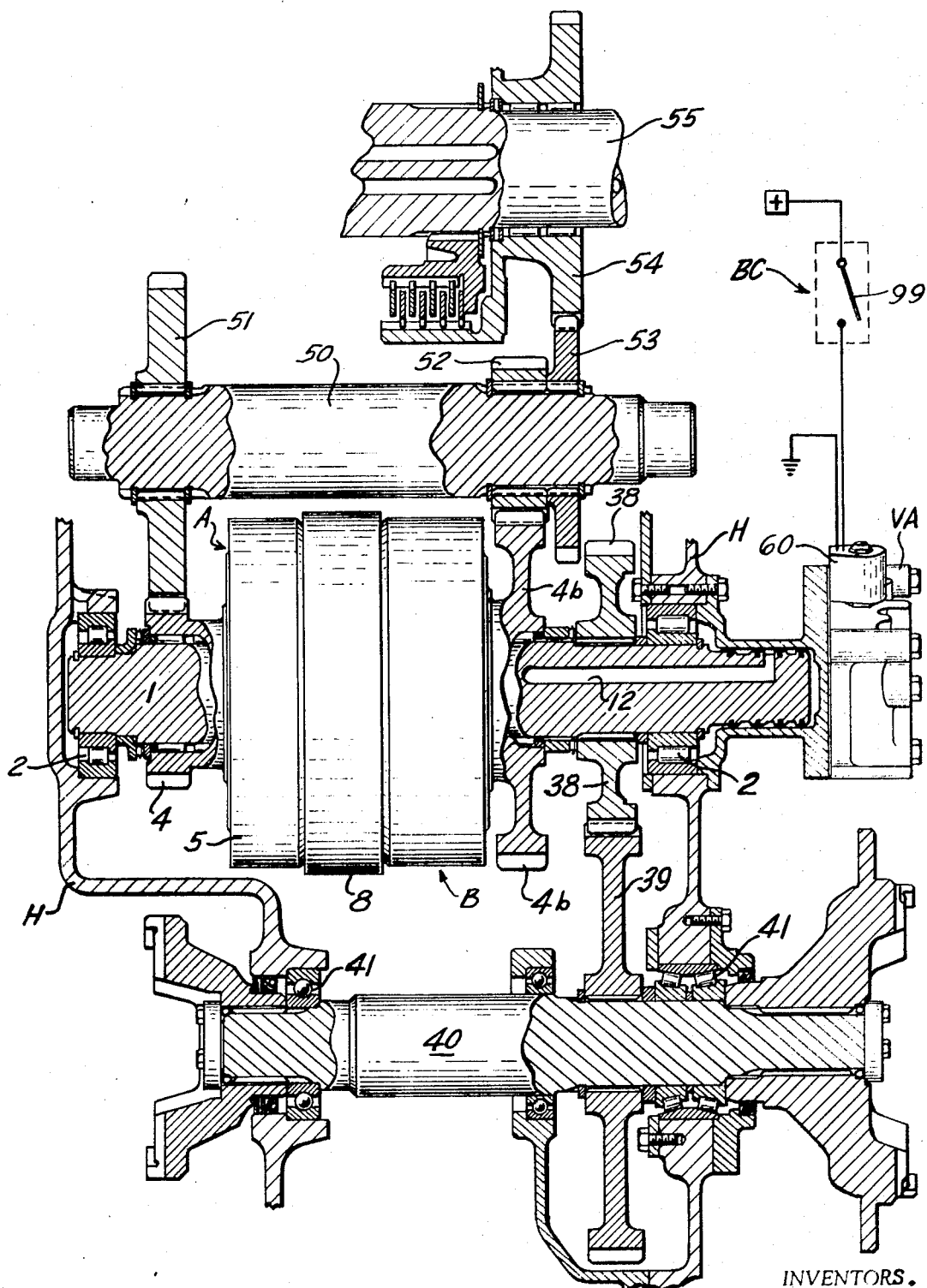
FIG. 1 is a longitudinal cross sectional view through a power transmission embodying the present invention.

The transmission of the present invention includes a shaft 1 which is journalled in the vehicle transmission housing H by suitable anti-friction bearing assemblies 2. Mounted on the shaft 1 is a pair of hydraulically actuated friction plate type clutches A and B. Clutch A is a high range clutch and clutch B is the low range clutch. It will be noted from FIG. 1 that clutch A has a fewer number of plates than clutch B, therefore clutch A is of less capacity than is clutch B. Clutch A has a small gear 4 fixed to its drum 5 for rotation with the drum, and also has a hub 6 splined to the shaft 1. Interleaved friction plates 7 are axially splined to the internal portion of the drum 5 and to the hub 6. The central reaction member 8 is fixed to the shaft 1 and defines a hydraulic chamber 9 in which the piston 9a is axially slideable. Thus the chamber 9 is pressurized by means of fluid supplied through port 10 and valve 10V, radial passage 11 in the member 8 and shaft 1, rifle drilling 12 in the shaft, radial passage 13 in shaft 1, passage 14 in the housing of the fluid supply cover FSC, and conduit 15 from a source of pressure fluid such as a pump P.

These clutches themselves are of conventional character and the valve 10V may be of the type shown in U.S. Ser. No. 784,713, filed Dec. 18, 1968, now issued as U.S. Pat. No. 3,534,840, on Oct. 20, 1970 to Joseph B. Snoy, and entitled "Hydraulically Actuated Clutch having a Two Piece Feed Back Dump Valve."

Another means is provided for furnishing pressure fluid to the clutch A in order to provide a braking mode, and this means includes a portion 14a of passage 14 which is communication with a pressure regulating valve PRV, as will presently appear more fully. A check ball 16 is shiftable in passage 14a, and when the ball is in the braking position shown against the shoulder valve seat 17, it permits braking pressure fluid from valve PRV to pressurize chamber 9 and thereby engage the clutch A for braking.

The construction and operation of clutch B is as follows. Pressure fluid is admitted to the clutch actuating chamber 20 via port 21 in the reaction member 8 and which fluid has been supplied through the valve 20V. Valve 20V of clutch B is similar in construction and function to valve 10V of clutch A. The fluid in turn has been provided to the radially inner side of valve 20V by means of cross port 22, rifle drilling 23, cross port 24 in the shaft, and port 25 in the housing which is connected to conduit 26. The conduit 26 receives pressure fluid from the pressure source, such as a pump P.

Suitable fluid flow valve 27 is provided to direct pressure fluid to either clutch A or clutch B for actuating these clutches.

The transmission arrangement is such that clutch A is pressurized for third and fourth gear ratios which are at higher gear speeds and clutch B is pressurized or actuated for the first and second gear ratios that are of lower speed.

Passage 30 provides cooling oil to clutches A and B for normal operation and passage 32 provides additional cooling oil to clutch A during the braking mode.

Secured to shaft 1 for rotation therewith is another gear 38 which is splined to shaft 1. Gear 38 is in constant mesh with a gear 39 (FIG. 1) that is fixed to the output shaft 40 of the transmission. The output shaft is suitably jouranlled in anti-friction bearings 41 in the housing H and it is believed sufficient to say that the shaft 40 is connected in the conventional manner to the wheels (not shown) of the vehicle.

Also rotatably journalled in the vehicle housing H is a common jack shaft 50 having gears 51 and 52 fixed thereto for rotation therewith. A third gear 53 is also secured to jack shaft 50 and power is delivered to the jack shaft via the gear 53 from a gear 54 that is fixed to a power input shaft 55 of the transmission. Gear 52 of jack shaft 50 is in constant mesh with a gear 4b fixed to the drum of clutch B, while gear 51 of jack shaft 50 is in constant mesh with gear 4 of clutch A. It will be noted that the gear ratio between gears 4 and 51 is different than the ratio between gears 4b and 52.

BRAKE CONTROL

Hydraulic control mechanism is provided for actuating the hydraulic clutch A for the braking function, and this valve assembly VA is shown as being attached to the housing H adjacent the end of shaft 1.

The valve assembly VA includes a pressure regulating valve PRV, a solenoid operated valve SOV, and a cooling valve CV, all of which are connected together in the valve assembly.

The solenoid operated valve SOV (FIG. 4) includes an electrically actuated solenoid 60 which when energized, causes a disc valve 61 to shift to the left (as viewed in FIG. 4), thereby opening a small passage 62 in a member 63 within the valve housing 64. A spool 65 is axially shiftable in the housing and is biased by springs 66 to the left, and main line pressure fluid, say for example at 200 p.s.i., from a pressure source such as pump P, enters the port 68 of the valve body and fills passage 69 that communicates with the chamber 70. Thus, when the solenoid has pulled the disc valve 61 away from orifice 62, pressure fluid can enter passage 62 and bear against the left end of the spool 65. This causes the spool 65 to shift to the right, against the bias of spring 66, thereby allowing pressure fluid to go to discharge port 73.

When the solenoid has thus permitted fluid pressure to shift the spool 65 to the right, pressure fluid flows through passage 74, the solenoid operated valve and into passage 80 of the pressure regulating valve PRV.

The pressure regulating valve PRV serves to reduce the main supply pressure, of say 200 p.s.i., down to say 50 p.s.i. which is then directed to the high range clutch A to cause braking action, as will appear.

The pressure regulating valve includes a shiftable spool 81 which is biased by springs 82 to the left hand position as shown in the drawings. Pressure fluid passes around the valve spool 81 to passage 84. Pressure fluid also passes through a passage 85 in the valve spool and to the area 86 at the left hand end of the spool, tending to move spool 81 to the right, as viewed in FIG. 4. Pressure fluid in passage 84 is then directed to the passage 14a in the fluid supply cover FSC, to actuated clutch A in the braking mode, as follows.

When pressure fluid enters the passage 14, the check ball 16 blocks pressure fluid from conduit 15 which is at that time open to sump. Pressure fluid flows through passage 13 for entry into the clutch actuating chamber 9. In this manner, the pressure fluid from the pressure regulating valve PRV enters the clutch actuating chamber 9 and the amount of pressure that is present to actuate the clutch is governed by an adjustment screw 88 covered by a removable cap 88a on the end of the pressure regulating valve. The adjusting screw regulates the amount of bias provided by the springs 82, that is it pushes on springs 82 which determine the amount of load on the valve 81 and consequently determines the amount of pressure to which the valve will regulate.

Pressure fluid is also provided to cool the clutch A at the same time the clutch A is actuated, and this is accomplished by pressure fluid flowing from port 73 to passage 100 in the cooling valve CV at the same time pressure fluid flows to the pressure regulating valve PRV as described.

Figure 2:
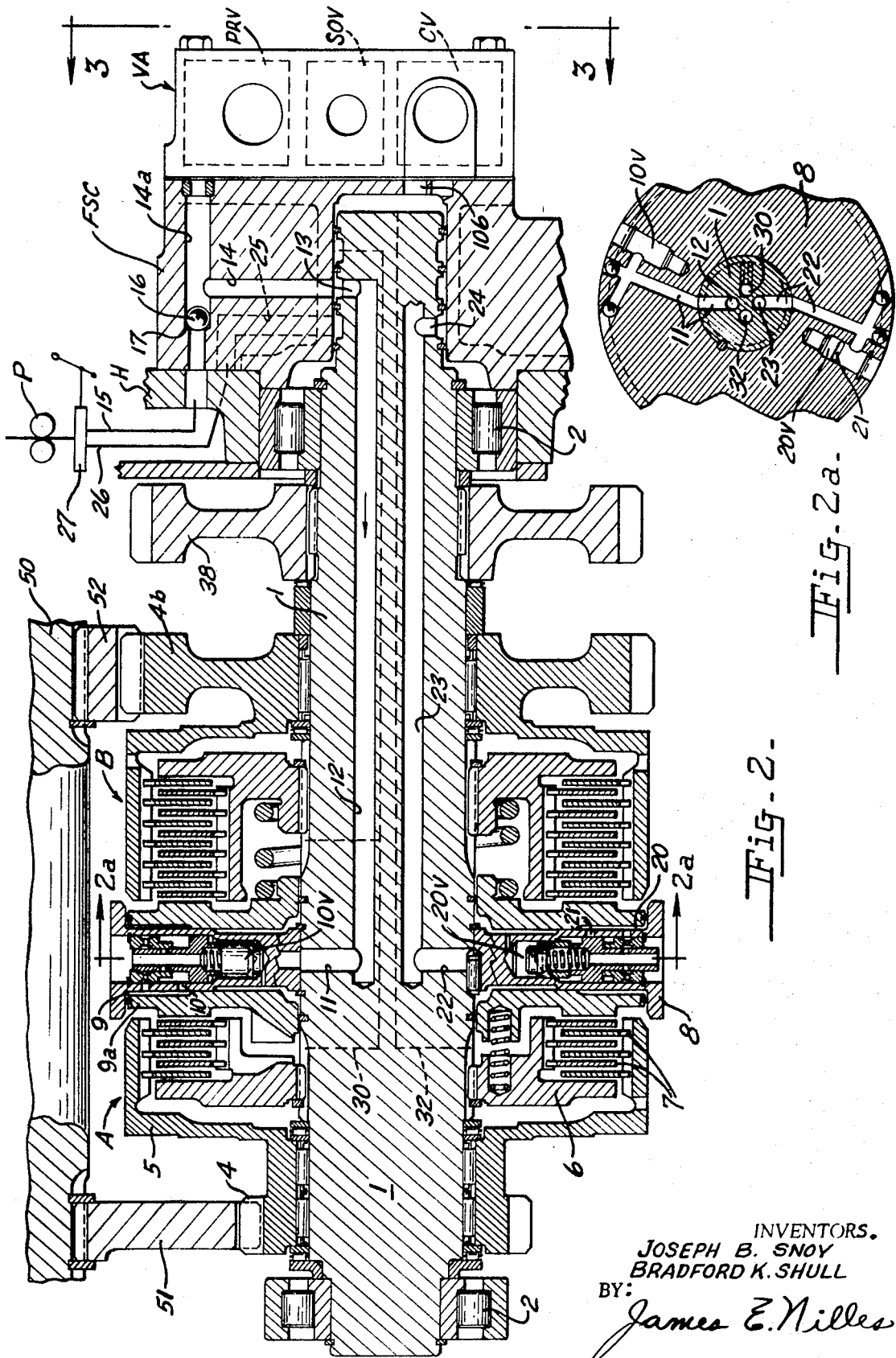
FIG. 2 is a longitudinal view of a portion of the transmission shown in FIG. 1, on an enlarged scale.
Figure 3:
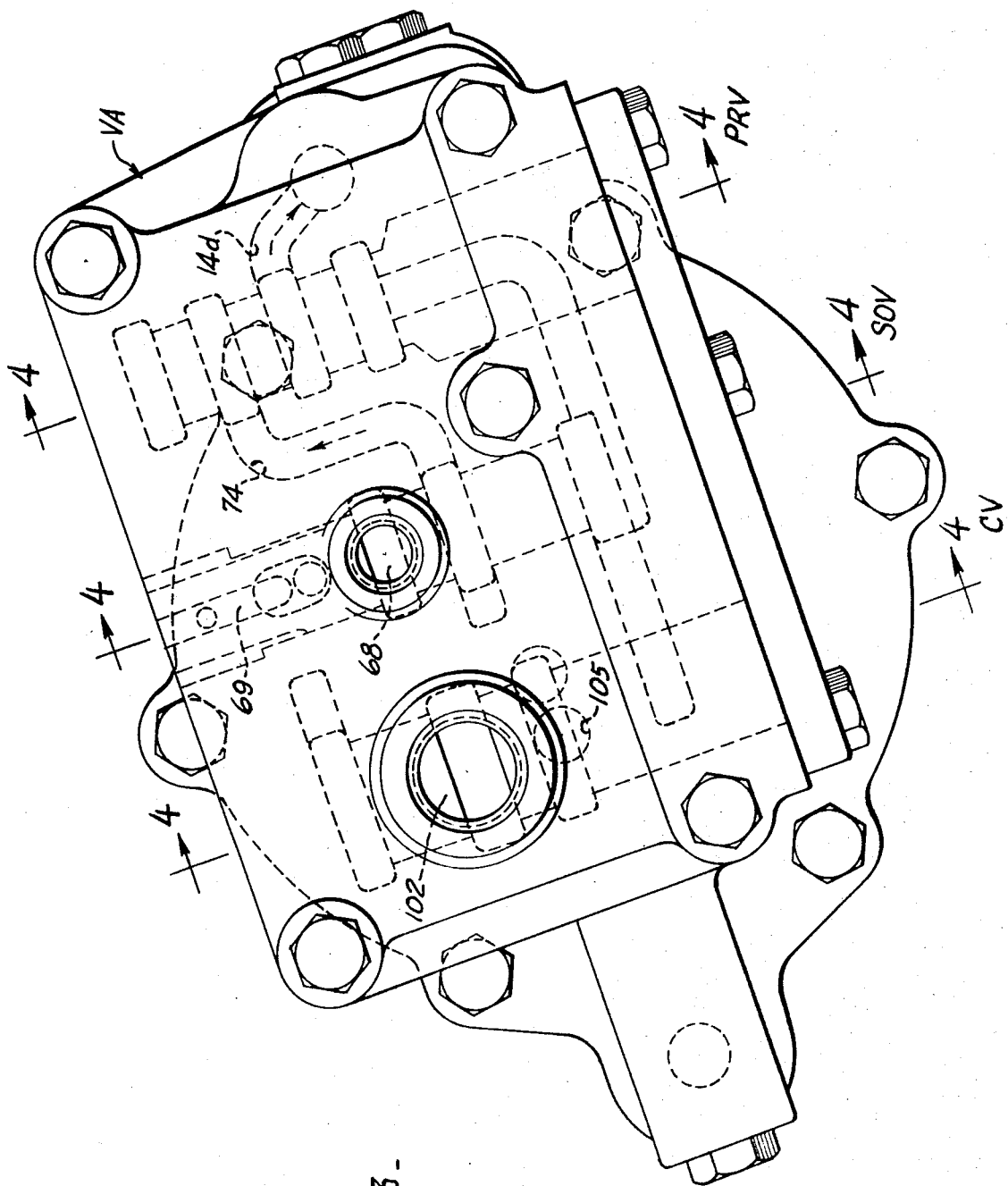
FIG. 3 is an enlarged, elevational view taken along line 3—3 in FIG. 2.

The cooling valve CV includes a shiftable spool 101 and a cooling oil inlet passage 102, which inlet always has cooling fluid available, at say 40–60 p.s.i., from a source, not shown, such as the converter of the transmission. As pressure enters passage 100 behind the end of spool 101 in the cooling valve, it causes the spool 101 to shift to the right (as viewed in the drawings) and against the bias of spring 104. This shifting of the spool permits the pressure fluid in passage 102 to flow out the discharge passage 105 of valve CV, through passage 106 (FIG. 2) and into the volume at the end of shaft 1, and through cooling passage 30 in the shaft 1 to clutch pack A.

OPERATION

The operation of the system is as follows. Clutch B is always engaged in first, second and neutral in both forward and reverse directions. Clutch shaft 1 is always locked to gear 4b through clutch B. Gear 4b in turn is in constant mesh with gear 52 which is splined to the jack shaft 50. Gears 4b and 52 have different numbers of teeth. This difference in the number of teeth prevents rotation of the shaft 50 when clutch A is also engaged. Gear 51 meshes with gear 4 which is attached to one set of the friction plates in clutch A. Shaft 1 is attached to the other set of friction plates in clutch A. Shaft 1 is also attached to gear 38 through the spline connection. Gear 38 meshes with gear 39 which is spline connected to shaft 40. Shaft 40 is attached to the wheels (not shown) of the vehicle through the drive line (not shown).

The brake system provided by the present invention is only applicable in first and second gears, that is when clutch B is engaged. It is when the vehicle is moving at these relatively lower speeds that the present brake can be applied. Thus if the clutch B is engaged to provide low range of vehicle movement when the operator causes actuation of the solenoid 60, the clutch A becomes engaged at a low pressure thus, slipping and acting as a inertia brake. More specifically, when the operator shifts a conventional directional control (not shown) into neutral, the switch 99 shown in the brake control BC (FIG. 1) is closed, thereby energizing or actuating solenoid 60. The clutch plates of clutch A will slip until the motion of the vehicle has stopped. At the same time the clutch A is being used as a brake, the plates of clutch A are cooled by fluid from the valve CV, as the brake provided by clutch A is provided with a finite amount of energy which it must be able to dissipate.

After the vehicle has come to rest, the operator advances the brake control BC (FIG. 1) to reverse position. This action engages a second reverse clutch solenoid (not shown) and opens the switch 99 in the brake control BC, thereby de-energizing solenoid 60. Deenergized solenoid 60 permits valve plate 61 to cover orifice 62, removing oil pressure from left end of valve 65. Spring 66 moves valve 65 to the left, thereby blocking main pressure from entering passage 73. Passage 73 is then opened to sump which dumps the pressure from passage 100 and allows the valve spool 101 to stop the flow of cooling oil from passage 102 to 105. Passage 105 is then opened to sump and the supply pressure that is also applied to the pressure reducing valve PRV have been interrupted.

We claim:

1. A power transmission having a shaft, a pair of hydraulically actuated, friction clutches mounted on said shaft, one of said clutches being of greater capacity than the other clutch, said clutches each having a rotatable element including a gear, said gears being of different size and journalled on said shaft, said clutches also having an input portion fixed to said shaft for rotation therewith, disengagable friction means between the element and input portion of each clutch for permitting clutch clamp up and rotation of said portion and element of a clutch together as a unit, a jack shaft journalled in parallelism to said shaft, a pair of gears fixed to said jack shaft for rotation therewith, said gears meshing with a respective gear on said shaft, fluid control means for actuating said clutch of greater capacity to drive said shaft, fluid control valve means for actuating the clutch of less capacity whereby said less capacity clutch slippingly engages until it is fully engaged and thereby stop rotation of said shaft, said fluid control valve means including a solenoid operated valve for receiving main linefluid pressure from a fluid pressure source, a pressure regulating valve for receiving fluid pressure from said solenoid operated valve and directing it to said other clutch of less capacity, a cooling valve separate from said regulating valve and having fluid communication with said solenoid operated valve for being actuated thereby, said cooling valve also having a fluid receiving communication with said other clutch of less capacity, whereby when said solenoid operated valve is actuated it engages said clutch of less capacity for engagement thereof and also actuates said cooling valve to cause flow of cooling fluid from a separate cooling fluid source to said clutch of less capacity during engagement thereof.

* * * * *